(12) United States Patent
Tamaki et al.

(10) Patent No.: US 7,138,946 B2
(45) Date of Patent: Nov. 21, 2006

(54) SYSTEM AND METHOD FOR POSITION DETECTION OF A TERMINAL IN A NETWORK

(75) Inventors: Tsuyoshi Tamaki, Hachioji (JP); Atsushi Ogino, Kodaira (JP); Takaki Uta, Kokubunji (JP); Ryota Yamasaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 10/866,722

(22) Filed: Jun. 15, 2004

(65) Prior Publication Data

US 2005/0078033 A1   Apr. 14, 2005

(30) Foreign Application Priority Data

Oct. 14, 2003   (JP) ............................. 2003-353096

(51) Int. Cl.
*G01S 3/02*   (2006.01)
(52) U.S. Cl. ...................... 342/463; 342/457
(58) Field of Classification Search ............... 342/451, 342/457, 463, 464, 465; 455/456.1, 456.2, 455/456.3, 456.6
See application file for complete search history.

(56) References Cited

U.S. PATENT DOCUMENTS

| | | | |
|---|---|---|---|
| 6,047,176 A * | 4/2000 | Sakamoto et al. | 455/422.1 |
| 6,865,394 B1 * | 3/2005 | Ogino et al. | 455/456.1 |
| 2005/0096033 A1 * | 5/2005 | Miyawaki et al. | 455/422.1 |
| 2006/0046765 A1 * | 3/2006 | Kogure | 455/522 |

FOREIGN PATENT DOCUMENTS

| | | |
|---|---|---|
| JP | 2-44929 | 8/1988 |
| JP | 9-247737 | 3/1996 |
| JP | 2000-244967 | 2/1999 |

OTHER PUBLICATIONS

A. Ogino et al, "Integrated Wireless LAN Access system—Study on Location System", 2003 IEICE General Meeting, p. 662.
Katsuhiko Tsunehara et al., "Integrated Wireless LAN Access System—Study on Position Location Accuracy", 2003 IEICE General Meeting, p. 663, with English translation.

* cited by examiner

*Primary Examiner*—Dao Phan
(74) *Attorney, Agent, or Firm*—Reed Smith LLP; Stanley P. Fisher, Esq.; Juan Carlos A. Marquez, Esq.

(57) ABSTRACT

In a position detection system for detecting a position of a terminal apparatus of a radio communications system, a position detection time is shortened using a position detection method for determining signal times-of-arrival between the terminal apparatus and base stations neighboring the terminal apparatus. According to the present invention, means for generating a database in which received power information about signals transferred between the terminal apparatus and the base stations neighboring the terminal apparatus corresponds to position information about the terminal apparatus, and for determining the position information by searching received power information obtained in the position detection from the database, and means for determining the position by use of signal times-of-arrival are executed in parallel. Then, the use of a result of the means which has detected the position earlier than another means shortens the position detection time.

19 Claims, 11 Drawing Sheets

POSITION DETECTION METHOD USING RECEIVED POWER

POSITION DETECTION METHOD USING SIGNAL ARRIVAL TIME DIFFERENCE

POSITION CALCULATION $D_i - D_2 = c \times (T_i - T_2) \quad (i=3, 4)$ $D_i = \sqrt{(X_i - X)^2 + (Y_i - Y)^2 + (Z_i - Z)^2}$ c : LIGHT SPEED

RECEIVED POWER MEASUREMENT METHOD
(USING UPLINK)

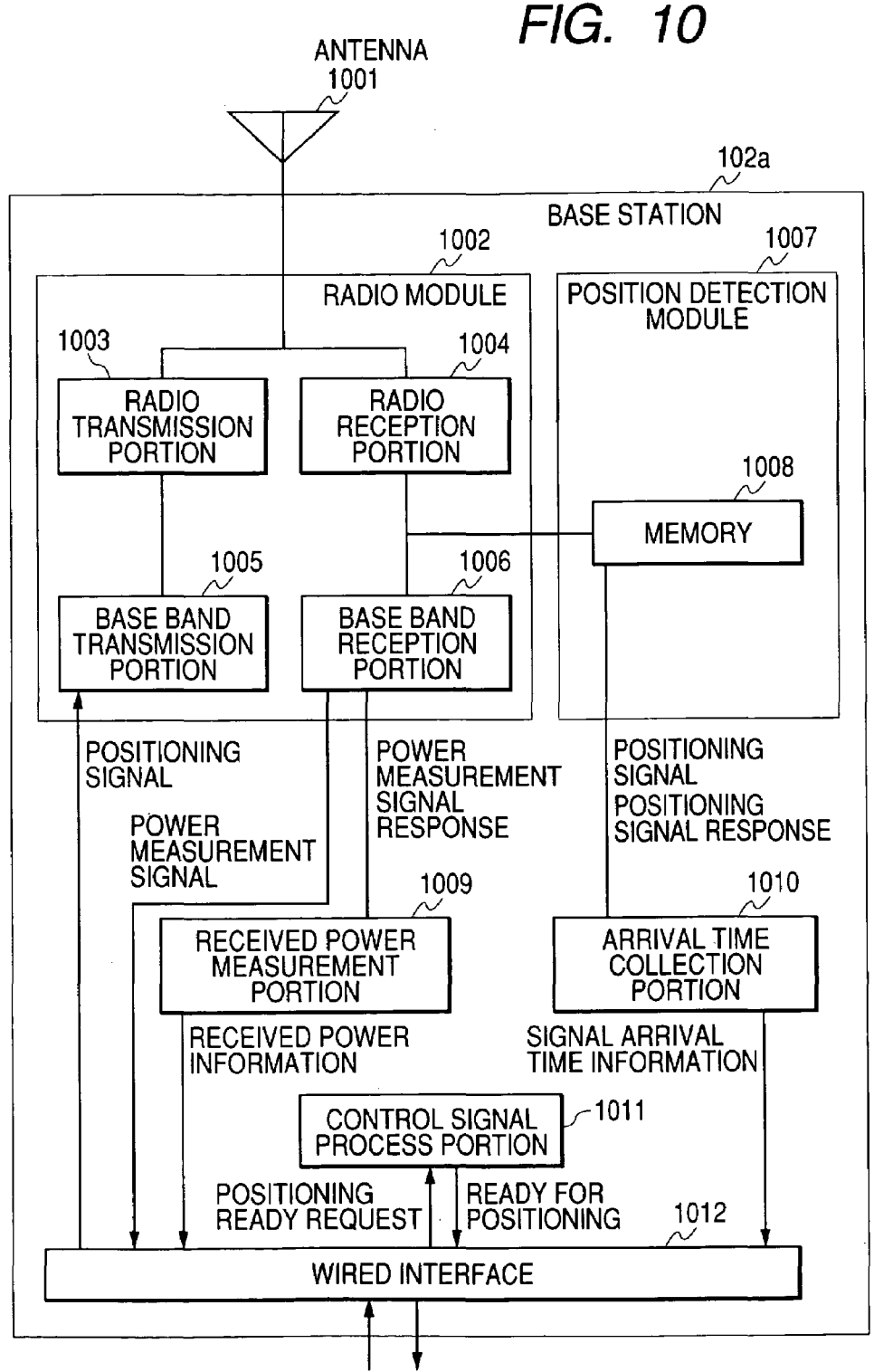

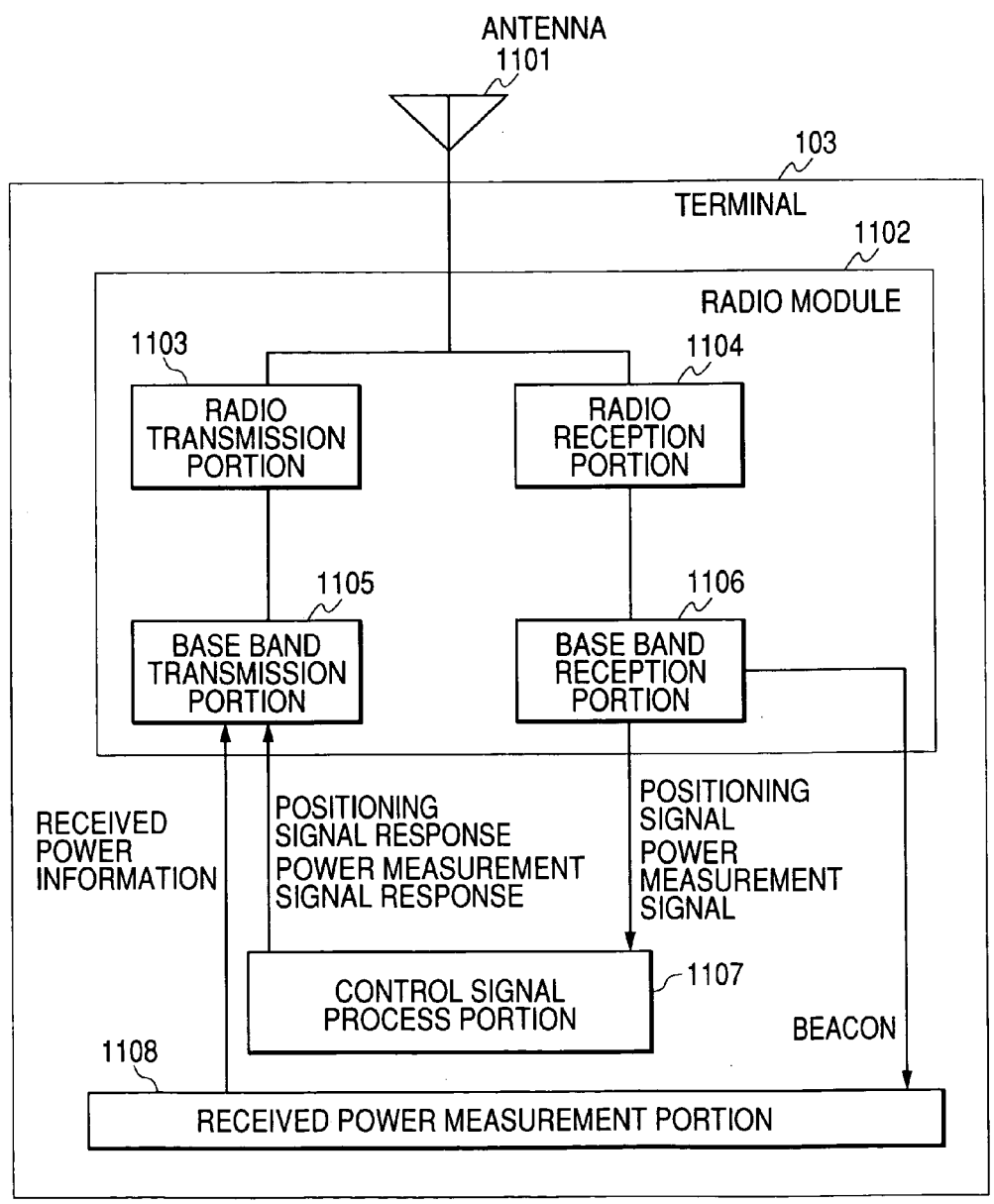

SYSTEM AND METHOD FOR POSITION DETECTION OF A TERMINAL IN A NETWORK

CLAIM OF PRIORITY

The present invention application claims priority from Japanese application JP 2003-353096 filed on Oct. 14, 2003, the content of which is hereby incorporated by reference in its entirety.

BACKGROUND OF THE INVENTION

1. Field of the Invention

The present invention relates to a radio communications system and a position detection method for achieving position detection of a mobile or fixed terminal.

2. Discussion of Background

A GPS (Global Positioning System) is well known as recent mobile communications systems represented by, for example, mobile phones. GPS is such that a GPS receiver receives radio waves from a plurality of GPS satellites to determine distances from the satellites and then to calculate a reception position of a terminal according to trilateration. A method using a DGPS (differential GPS) is also well known. This method is such that a fixed GPS receiver of a known position receives radio waves from GPS satellites to measure a measurement error by comparing detected positions and a known position and then to remove an error of a neighboring GPS recipient.

In the position detection method using GPS or DGPS, at least radio waves from GPS satellites need to be received, so that a position of a terminal cannot be detected where GPS signals cannot be received. A position detection method not using GPS or DGPS is described in JP-A No. 247737/1997 (Patent Document 3). In this document, a trilateration method using estimated distances is disclosed. In this method, an electric field of signals received from a plurality of base stations of a mobile communications system is measured to estimate-distances between the base stations and a terminal. Also in this document, another method for detecting a position of the terminal by determining positions of the base stations in communication with the terminal is disclosed. Unfortunately, In the position detection method using received electric field, large errors occur due to level fluctuation such as multipath fading and shadowing, thus degrading accuracy of the position detection.

JP-A No. 93650/1994 (Patent Document 1) is an example prior art reference for improving the measurement accuracy. In this document, electric field strength maps of received electric field levels are previously prepared to determine a position of the terminal from the maps of a plurality of base stations. Unfortunately, in this method, the maps are hard to generate, and need to be generated again when the neighboring layout changes.

JP-A No. 244967/2000 (Patent Document 2) is an exampled of another prior art reference for improving the measurement accuracy. In this document, since a distance estimated from the received electric field strength has a large error, the measurement accuracy is improved using the fact that a round-trip propagation time between the base station and terminal in communication with each other has a small error. Additionally, to improve an accuracy of the distance estimated from the received electric field strength, a parameter of the radio wave propagation is modified according to accurate position information determined using the GPS system.

Documents "Wireless LAN Integrated Access System (1)" B-5-203 by Ogino, et al. (Non-Patent Document 1) and "Wireless LAN Integrated Access System (2)" B-5-204, by Tsunehara, et al. (Non-Patent Document 2), from Proceedings of the General Conference of the Institute of Electronics, March 2003, Information and Communication Engineers, are exampled as further prior arts for improving the measurement accuracy. These documents describe that, by use of a wireless LAN (Local Area Network) system, a TDOA (time difference of arrival) from a terminal to each base station is measured to determine a position of the terminal according to trilateration. JP-A No. 244967/2000 describes that the error when a distance is estimated from the time-difference-of-arrival is smaller than the error when a distance is estimated from received power strength. The method of JP-A No. 244967/2000 uses the time difference of arrival only when the distance between the base station and the terminal in communication with each other is measured. In a position detection method according to TDOA using the wireless LAN system, the time difference of arrival between all the neighboring base stations and the terminal are measured to improve the accuracy of the position detection.

However, in the position detection method using the wireless LAN system, modulation of the time-differences-of-arrival between the base stations operated by asynchronous clocks and calculation of time-differences-of-arrival between all the base stations and the terminal are executed every measurement to determine the solution according to trilateration. As a result, many calculation processes are required to take a long time until the position detection.

SUMMARY OF THE INVENTION

In view of the above description, an object of the present invention is to provide a radio system for shortening a time for position detection in a radio communications system while keeping an accuracy of the position detection, a server, base stations, a terminal for configuring the radio system, and a method for detecting a position of the terminal in the radio communications system.

To achieve the object by solving the above-described problems, a radio communications system of the present invention includes at least one terminal having means for measuring received powers from a plurality of base stations and means for responding to a signal transmitted from the base station in communication with the terminal, a base station having means for collecting signal time-of-arrival information from a signal transmitted from the base station and a response signal from the terminal, a database for storing information about received powers measured in the terminal and signal time-of-arrival information collected in the base station, and a server having means for determining position information from the received power information by searching the database and means for determining position information from the signal time-of-arrival information according to trilateration. The means for determining position information by searching the database and the means for determining position information according to trilateration are processed in parallel, so that a position detection method in which a position detection time is shortened is provided.

According to the present invention, when position information is determined from the signal time-of-arrival information according to trilateration, the received power information is used, so that a range of calculation of position information can be narrowed to shorten the calculation time.

A plurality of the base stations has means for measuring a received power of a response signal from the terminal to the base station in communication with the terminal. The means for determining position information by searching received power information collected in the base stations as elements of the database and the means for determining position information from signal time-difference-of-arrival information according to trilateration are processed in parallel, so that the position detection time can be shortened.

According to the present invention, since the terminal does not need to collect the received power information from a plurality of the base station, not many functions are required for the terminal, so that a structure of the terminal can be simplified.

According to the present invention, the position detection method using signal time-difference-arrival between the terminal and a plurality of the base stations neighboring the terminal and the position detection method using received power information about beacons periodically transmitted to the terminal from a plurality of the base stations neighboring the terminal or about signals transmitted from the terminal to the base stations neighboring the terminal are processed in parallel. As a result, the position detection time can be shortened using a result of the position detection determined earlier.

In the position detection method using signal time-difference-of-arrival, the position is roughly calculated using the database of the received power information to narrow a searched range of the solution, so that an amount of the calculations can be reduced to shorten the position detection time using the signal time-difference-of-arrival.

Additionally, the point information and received power information determined through the position detection using signal time-difference-of-arrival correspond to each other, so that the database can be automatically generated. As a result, a map of the received powers does not need to be manually generated before the installation of the base stations. Further, even when the neighboring layout changes, the database is updated, so that the map is automatically modified.

In the embodiment using the position detection method using the received power information about the signals transmitted from the terminal to the base stations neighboring the terminal, when ICMP protocol is regularly provided, addition of special functions is unnecessary, so that the position detection of a general multipurpose terminal is possible.

The invention encompasses other embodiments of a method, an apparatus, and a system, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 10 shows a configuration of a base station, in accordance with an embodiment of the present invention; and FIG. 11 shows a configuration of a terminal, in accordance with an embodiment of the present invention.

DESCRIPTION OF THE PREFERRED EMBODIMENTS

An invention for system and method for position detection of a terminal in a network is disclosed. Numerous specific details are set forth in order to provide a thorough understanding of the present invention. It will be understood, however, to one skilled in the art, that the present invention may be practiced with other specific details.

Figure 1:
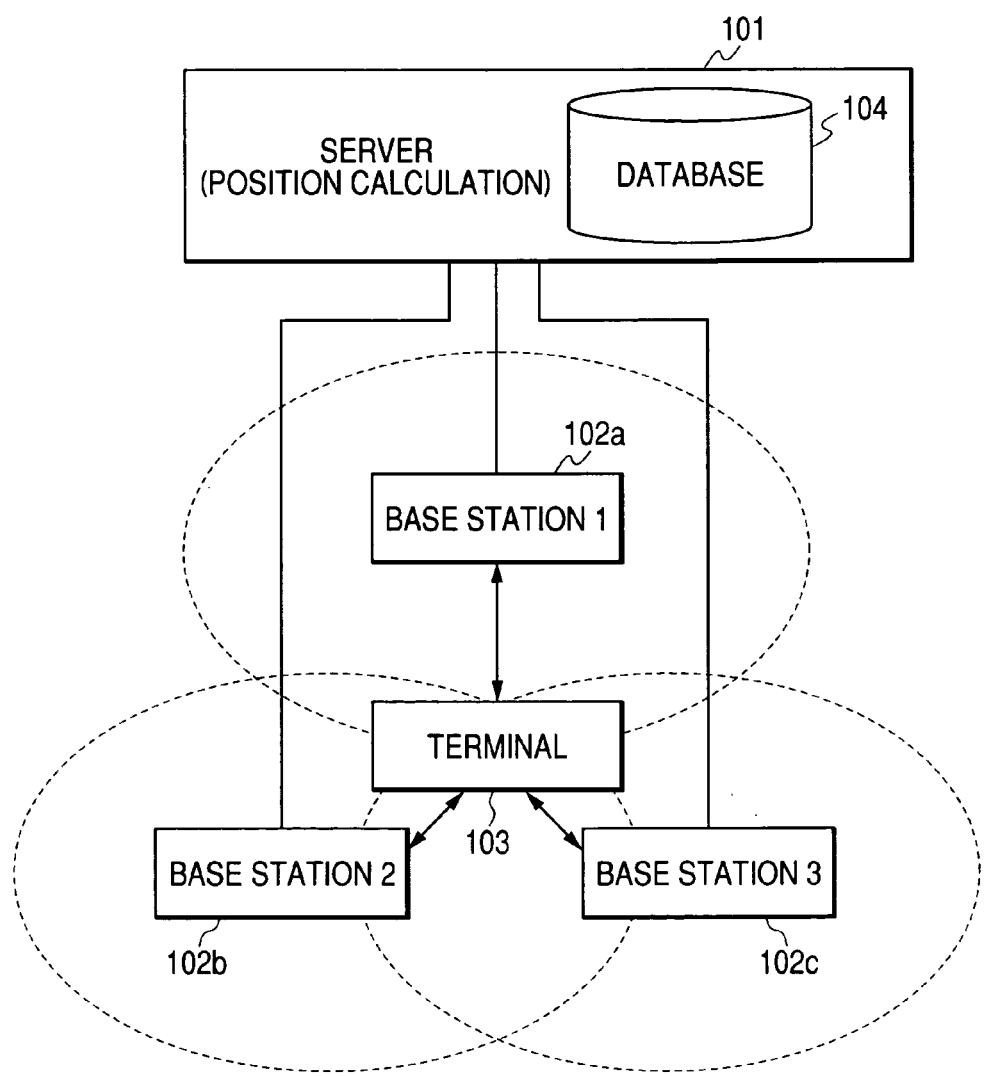
FIG. 1 shows a configuration of a radio communications system for detecting a position of a terminal, in accordance with an embodiment of the present invention.

FIG. 1 shows a configuration of a radio communications system of the present invention and a system configuration for detecting a position of a terminal.

The radio communications system includes a plurality of base stations $102a$, $102b$, and $102c$, a terminal $103$ within coverage of the base stations $102a$, $102b$, and $102c$, and a server $101$ having in its storage a database $104$ for collecting information required for calculating a position of the terminal $103$. A system configuration in which the database and the function for calculating the position are contained in the terminal $103$ or any one of the base stations $102a$, $102b$, and $102c$ is also possible. Therefore, the server $101$ is not always necessary.

In the radio communications system of the present invention, by using both a position detection method using received power and a position detection method using signal time-difference-of-arrival, these methods being after-mentioned, a position detection time can be shortened and the database $104$ can be automatically generated to reduce man-hours for the equipment installation.

Figure 2:
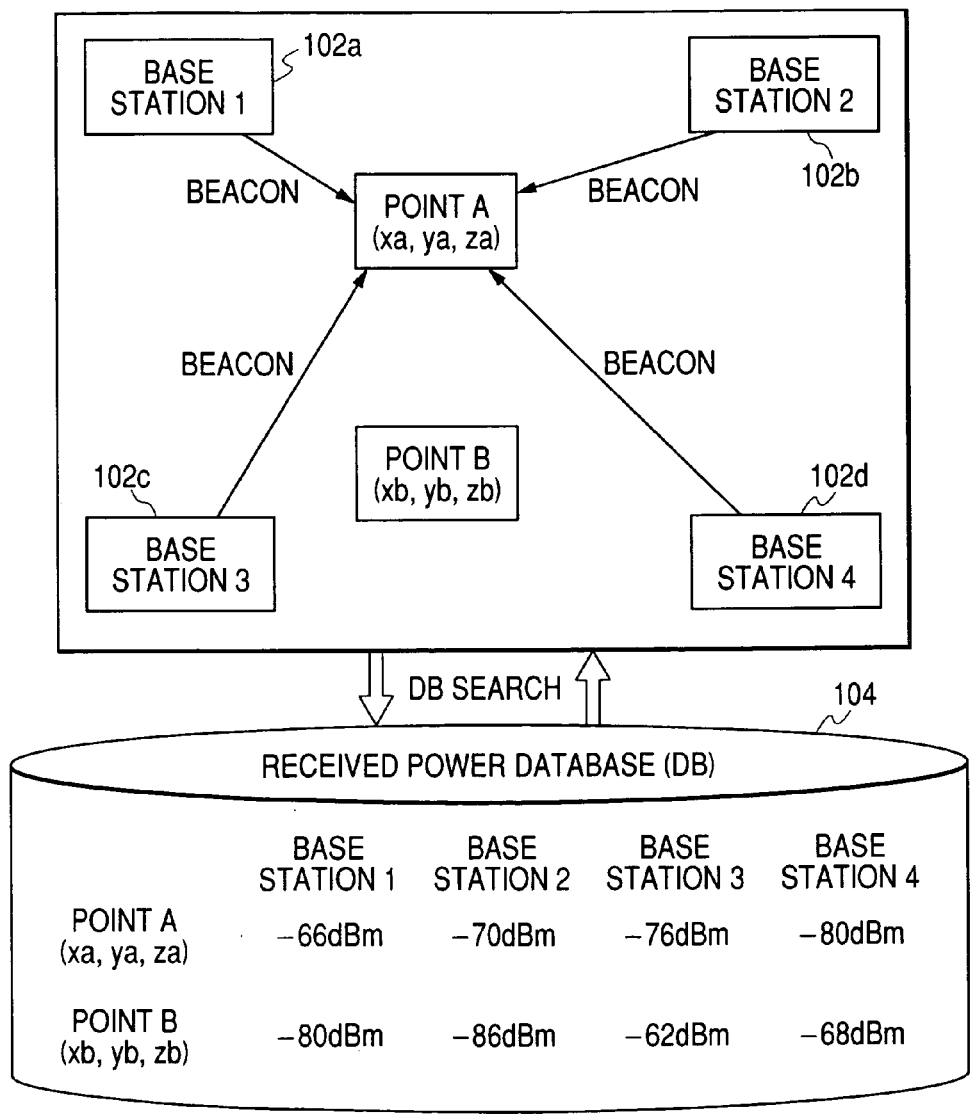
FIG. 2 shows a principle of a position detection method using received power, in accordance with an embodiment of the present invention.

FIG. 2 is an explanatory view of a principle of the position detection using received power. Beacon signals periodically transmitted from a plurality of the base stations $102a$, $102b$, $102c$, and $102d$ are received at each position. Received power values of the received beacon signals are recorded in the database to record correlation between coordinate values of each known position and the received powers. In an example of FIG. 2, averages of the received powers within a constant time are shown. For example, variances showing fluctuation of the received powers may also be recorded.

To detect the position, correlation between information of the produced database $104$ and averages/variances of the received powers measured by the terminal is checked. Then, coordinate values of a position assumed to have the highest correlation is determined as position information. For example, a least square error method in which the sum of the squares of differences between the corresponding data is minimized is used to determine the correlation.

Figure 3:
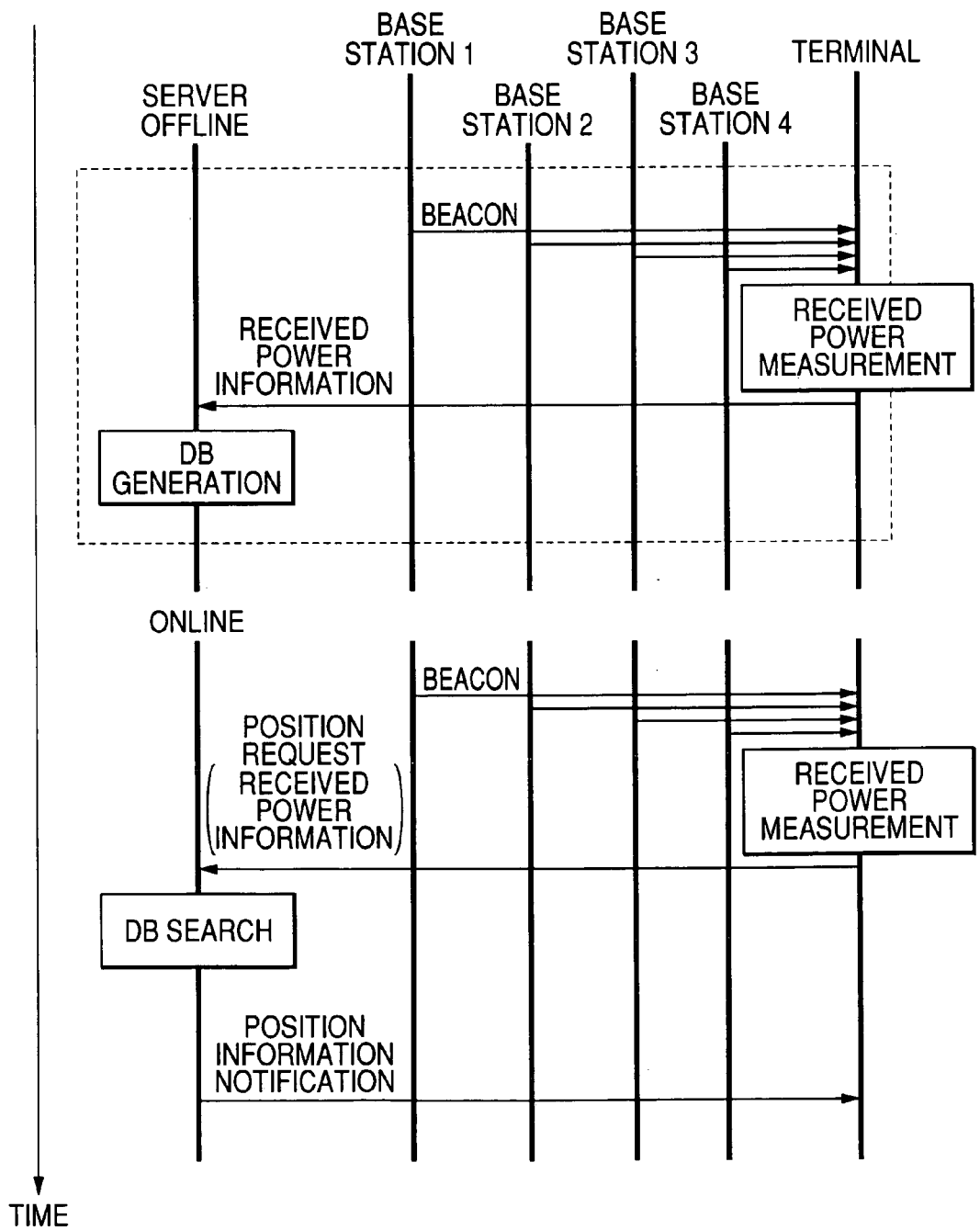
FIG. 3 shows a control flow of the position detection method using received power, in accordance with and embodiment of the present invention.

FIG. 3 is a control flow chart of the position detection method using received power. The above-described position detection method is divided into a phase for generating information of the database 104 and a phase for using the information.

In the phase for generating the information of the database 104, the terminal receives beacon signals periodically transmitted from a plurality of the base station to determine averages and variances of the received powers of the beacon signals. The server is notified of the determined data as received power information, and the data is registered to the database. The server is notified of point information showing where the terminal is positioned to obtain correlation between the point information and the received power information.

In the above-described prior art, to obtain the point information of the terminal, data of each point needs to be registered to the database before start of position detection service. In the present invention, by using the position information determined by means of the after-mentioned position detection method using signal time-difference-of-arrival, correlation between the position information and the received power information can be automatically generated.

In the phase using the database 104, the terminal receives beacon signals periodically transmitted from a plurality of the base stations to determine averages and variances of the received powers of each the beacon signals. The server is notified of this received power information and a position request. The server searches the database 104 to determine a position highly correlated with the received power information transmitted from the terminal. Coordinate values of the determined position are determined as position information. The terminal, for example, is notified of the determined position information.

Figure 4:
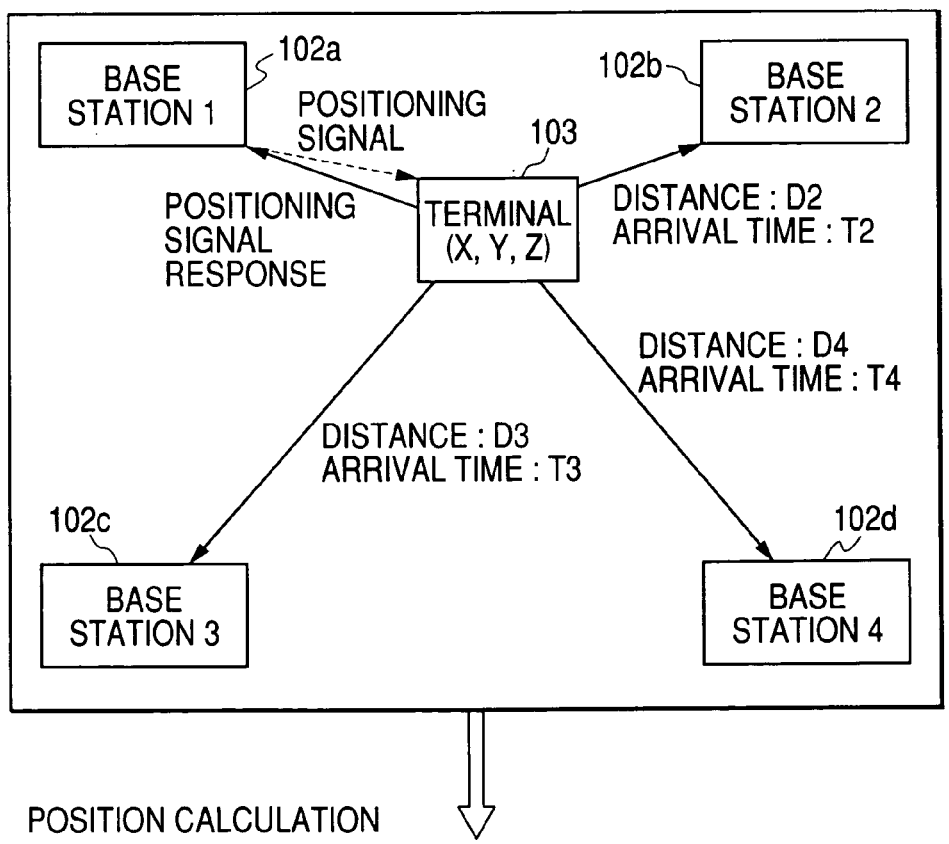
FIG. 4 shows a principle of a position detection method using signal time-difference-of-arrival, in accordance with an embodiment of the present invention.

FIG. 4 is an explanatory view of the principle of the position detection method using signal time-difference-of-arrival. Upon reception of a positioning signal transmitted from the base station 102a, the terminal 103 returns a positioning signal response to the base station 102a. If the base stations 102a, 102b, by use of their synchronized clocks, can measure a time-of-arrival of the positioning signal response from the terminal 103, a time-difference-of-arrival T3−T2 between a time-of-arrival T2 from the terminal 103 to the base station 102c and a time-of-arrival T3 from the terminal 103 to the base station 102b can be determined. When D2 is a distance from the terminal 103 to the base station 102b, and D3 is a distance from the terminal 103 to the base station 102c, the following equation holds.

$$D_3 - D_2 = c \times (T_3 - T_2) \quad \text{Equation 1}$$

Of the base stations 102c, 102d, the following equation (2) holds.

$$D_4 - D_2 = c \times (T_4 - T_2) \quad \text{Equation 2}$$

When coordinate values of the terminal are (X, Y, Z), and coordinate values of a base station i are (Xi, Yi, Zi), a distance Di between the base station i and the terminal can be determined by the following equation (3).

$$D_i = \sqrt{(X_i - X)^2 + (Y_i - Y)^2 + (Z_i - Z)^2} \quad \text{Equation 3}$$

By substituting the equation 3 for the equations (1) and (2), the simultaneous equations are solved to determine the coordinate values of the terminal (X, Y, Z).

At this time, since the time-of-arrival Ti of the positioning signal response from the terminal to the base station i includes an error, the solution for coordinates having the smallest error is determined using, e.g., the least square error method and a steepest gradient method. When clocks which are measurement standard in the base stations are asynchronous with each other, the time-difference-of-arrival T3−T2 includes an asynchronous error, for example.

When an equation fi(t)=t+Oi holds, where a clock fi(t) of the base station i is the sum of an absolute time t and an error Oi, and when a signal transmitted at an absolute t0 arrives at an absolute time ti, a time-difference-of-arrival Ti is determined by the following equation (4).

$$T_i = f_i(t_i) - f_i(t_0) \quad \text{Equation 4}$$

Therefore, the time-difference-of-arrival can be expressed by the following equation (5).

$$T_3 - T_2 = \{f_3(t_3) - f_3(t_0)\} - \{f_2(t_2) - f_2(t_0)\} = t_3 - t_2 + O_3 - O_2 \quad \text{Equation 5}$$

When, to remove this difference, the base stations 102a, 102b receive a positional signal from the base station 102a to measure times-of-arrival Tab, Tac, a time-difference-of-arrival Tab-Tac is determined by the following equation (6).

$$T_{ab} - T_{ac} = \{f_2(t_{ab}) - f_2(t_0)\} - \{f_3(t_{ac}) - f_3(t_0)\} = t_{ab} - t_{ac} + O_2 - O_3 \quad \text{Equation 6}$$

When a distance from the base station 102a to the base station 102b is Dab, and a distance from the base station 102a to the base station 102c is Dac, the following equation (7) holds.

$$D_{ab} - D_{ac} = c \times ((t_{ab} - t_0) - (t_{ac} - t_0)) = c \times (t_{ab} - t_{ac}) \quad \text{Equation 7}$$

Since the coordinate values of the base stations are known, an absolute time difference t3−t2 can be determined by removing error elements from the equations (5), (6), and (7). By solving the above-described simultaneous equations (1), (2), and (3) by use of the absolute time difference t3−t2 instead of a measurement value of the time-difference-of-arrival T3−T2, a coordinate position of the terminal can be determined.

Figure 5:
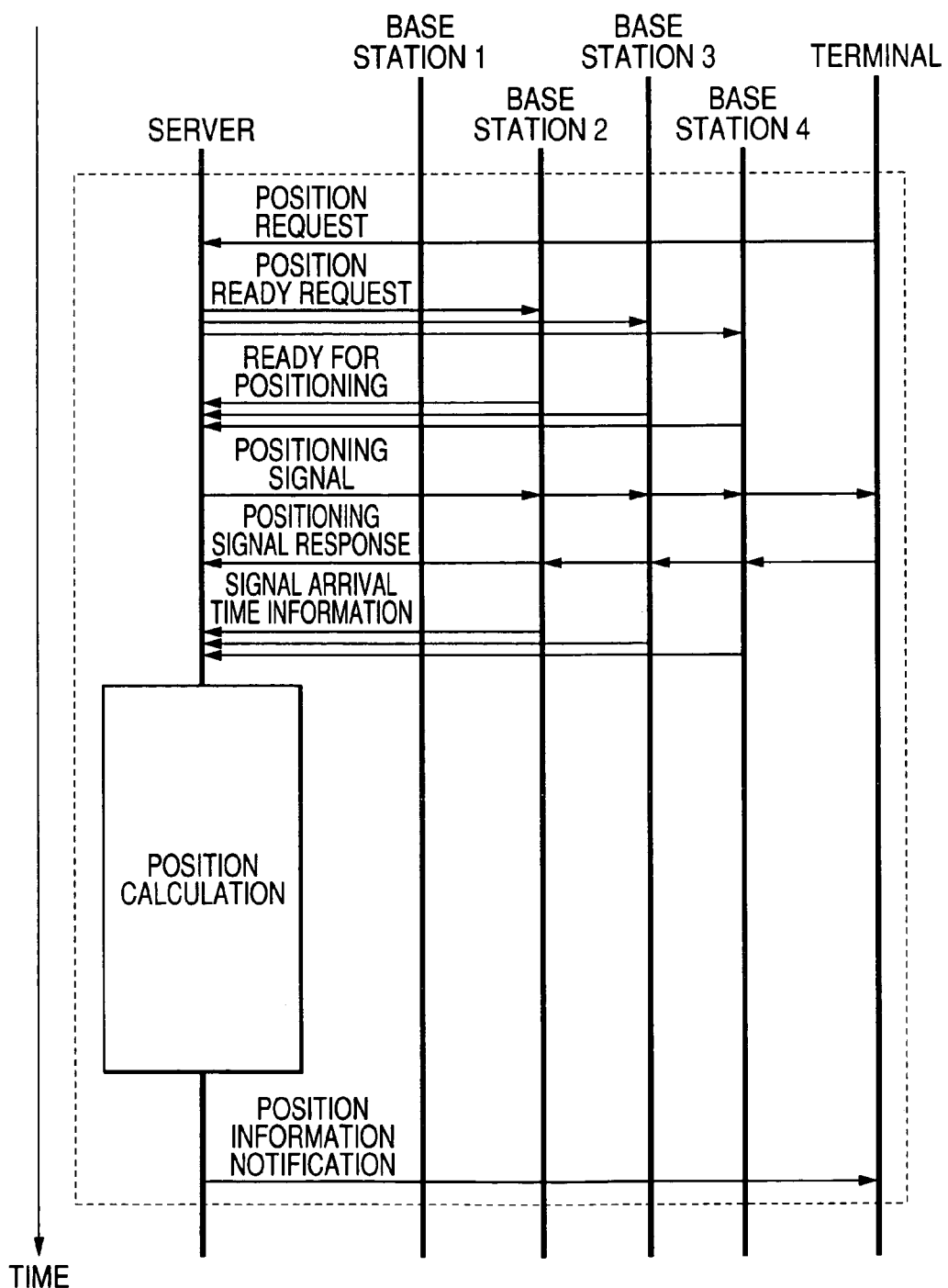
FIG. 5 shows a control flow of the position detection method using signal time-difference-of-arrival, in accordance with an embodiment of the present invention.

FIG. 5 shows a control flow of the position detection method using signal time-difference-of-arrival. In the following explanation, the terminal and the server communicate with each other via a base station 1 (called a standard station). Base stations 2 to 4 (called measurement base stations) receive signals transferred between the terminal and the standard base station to measure the reception timings. Upon reception of a position request from the terminal, the server transmits, to the base stations (measurement base stations) neighboring the terminal, a control signal of a positioning preparation request including frequency channel information of the base station (standard station) in communication with the terminal.

Upon reception of the positioning preparation request, each measurement base station is switched a frequency channel described in the positioning preparation request, and notifies a positioning preparation completion to the server when it is ready for receiving the positioning signal and the positioning signal response.

Upon reception of the positioning preparation completion from all the measurement base stations, the server transmits the positioning signal to the terminal. Upon reception of the positioning signal, the terminal returns the positioning signal response to the server. Upon reception of the positioning signal and the positioning signal response, the measurement base stations neighboring the terminal notify to the server the reception times and received signals as signal time-of-arrival information.

The server calculates a position of the terminal by solving the simultaneous equations (1) to (7). Then, the server notifies to the terminal the determined coordinates as position information notification.

Figure 6:
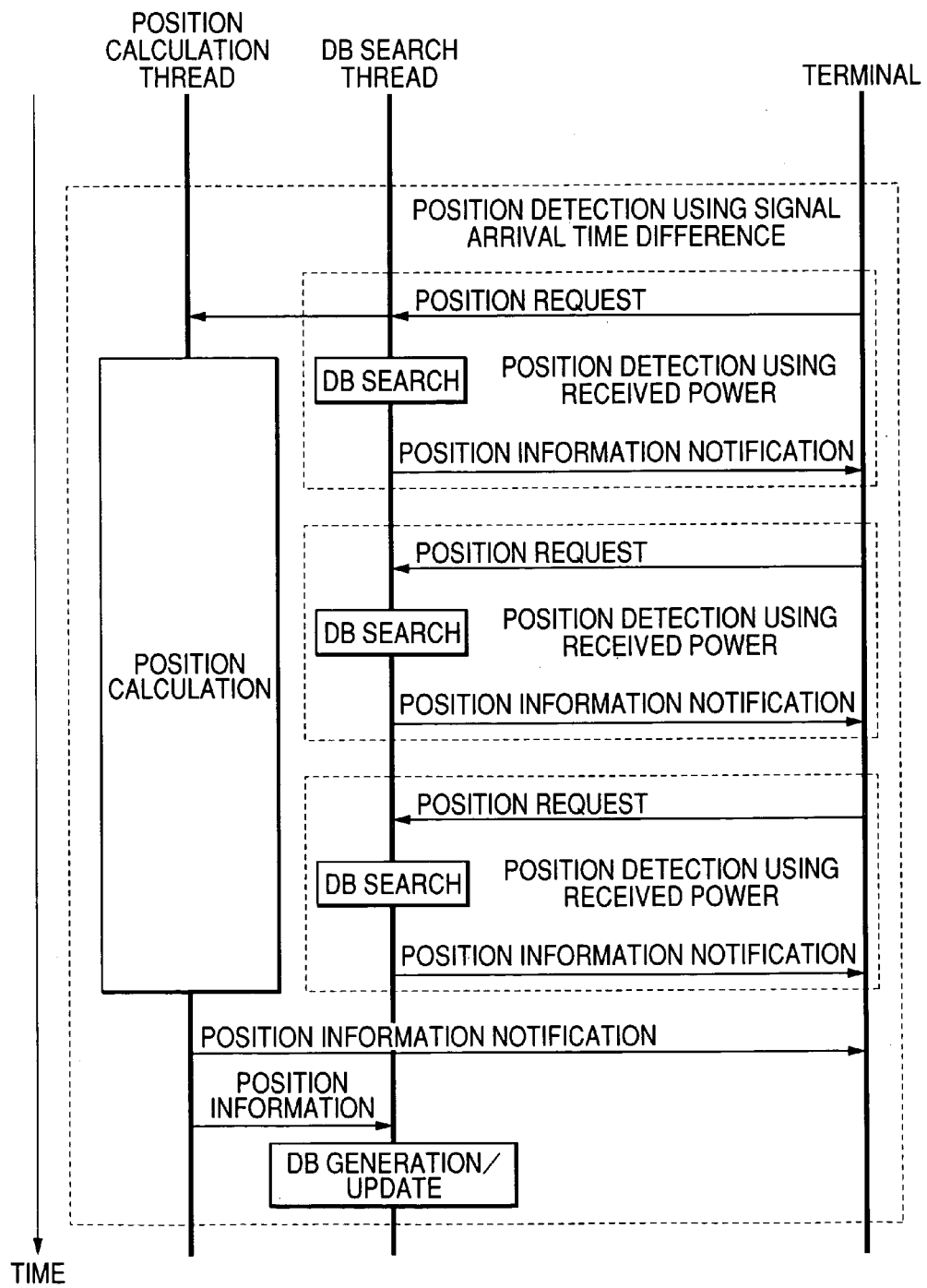
FIG. 6 shows a control flow of the position detection method, in accordance with an embodiment of the present invention.

FIG. 6 shows a control flow of a position detection method of an embodiment of the present invention. When a position request is transmitted from the terminal to the server, a position calculation thread of the server executes a position detection using the time-difference-of-arrival. Since this position calculation takes a long time, the server executes the position detection using the received power through a database search thread to notify a result of the position detection to the terminal when it receives a position request during the position calculation. The position detection using the received power is executed in parallel to the position detection using the signal time-difference-of-arrival, so that the terminal can be quickly notified of a result of the position detection.

Additionally, the position information and received power information of the terminal, both being requested by the position detection thread, correspond to each other to update the database or to generate a new database. The newly generated or updated database is used as a database for subsequent position detections.

When there is no information in the database shortly after placement of the base stations, the following procedures are possible. Measurement data of received powers of each position may be collected and manually registered to the database. The position detection may be executed without the database search thread until enough data for the position detection are stored in the database, so that the database is automatically generated according to result of the position calculation thread. In the latter case, even when there is no position request from the terminal until the enough database is structured, the position detection may be executed by transmitting the positioning signal to another adequate terminal according to judgment of the server, so that the database is structured. The adequate terminal is, e.g., one which executes no data communication or is assumed not to frequently shift its communication target base stations and not to move widely. In the adequate terminal, both the position detection and received power measurement are executed, and the server is notified of a result of the measurement.

Figure 7:
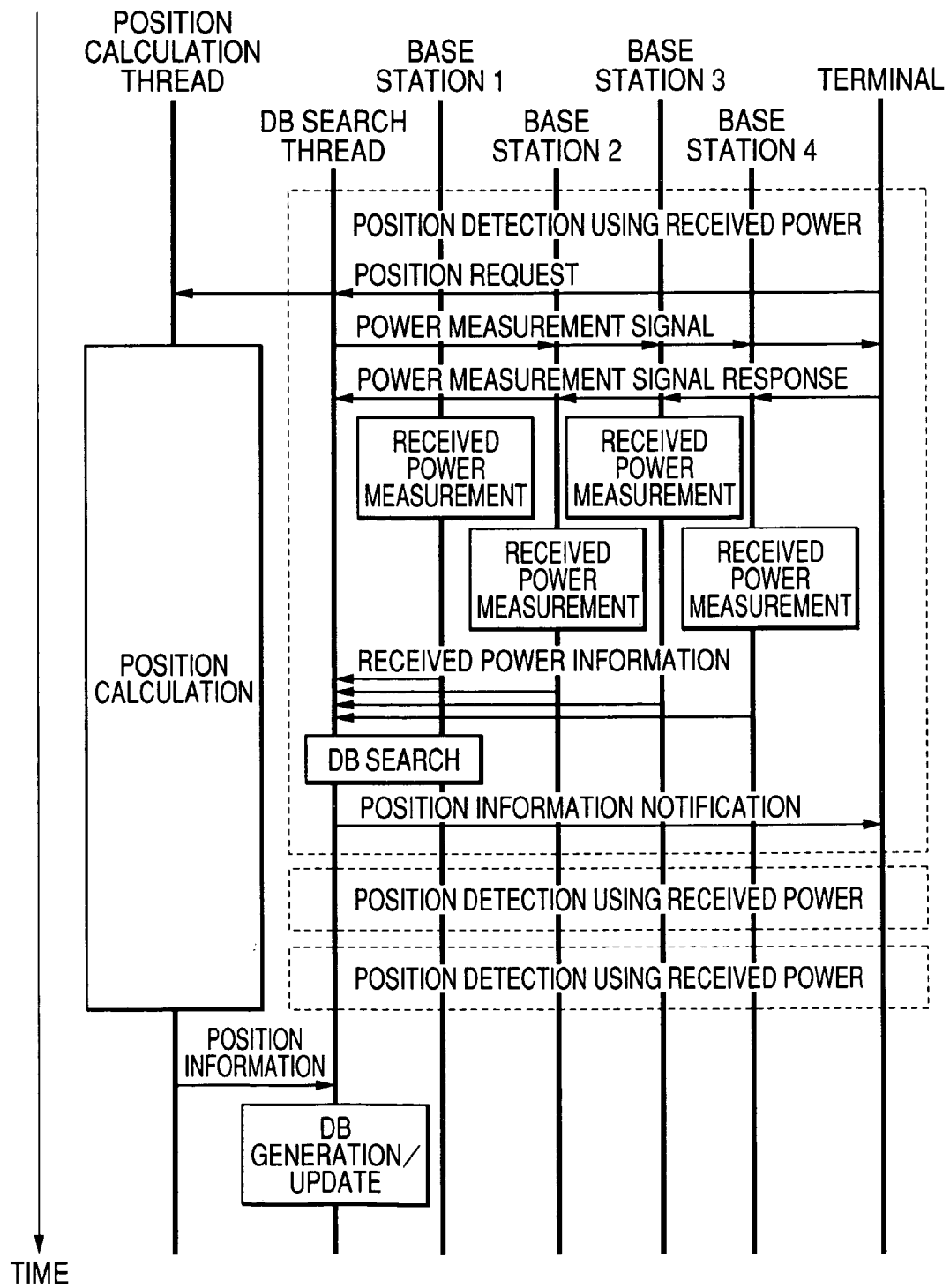
FIG. 7 shows a control flow of the position detection method, in accordance with an embodiment of the present invention.

FIG. 7 shows a control flow of a position detection method of another embodiment of the present invention. When a position request is transmitted from the terminal to the server, a position detection using signal time-difference-of-arrival is executed and substantially simultaneously a power measurement signal is transmitted from the server to the terminal to measure received powers. Upon reception of the power measurement signal, the terminal returns a power measurement signal response to the server.

The base stations neighboring the terminal receive the power measurement signal response transmitted from the terminal to measure the received powers, and notify the measurement result as received power information to the server. When the server collects the received power information from the base stations neighboring the terminal, it searches the database to determine a position of the terminal, and then notifies the position to the terminal as position information notification.

A database in which the position information of the terminal, the information being determined through the position calculation thread, and the received power information received at the base stations correspond to each other is newly generated or updated.

With this method, since the terminal does not need to have a function for measuring the received powers, it can be simply structured.

Figure 8:
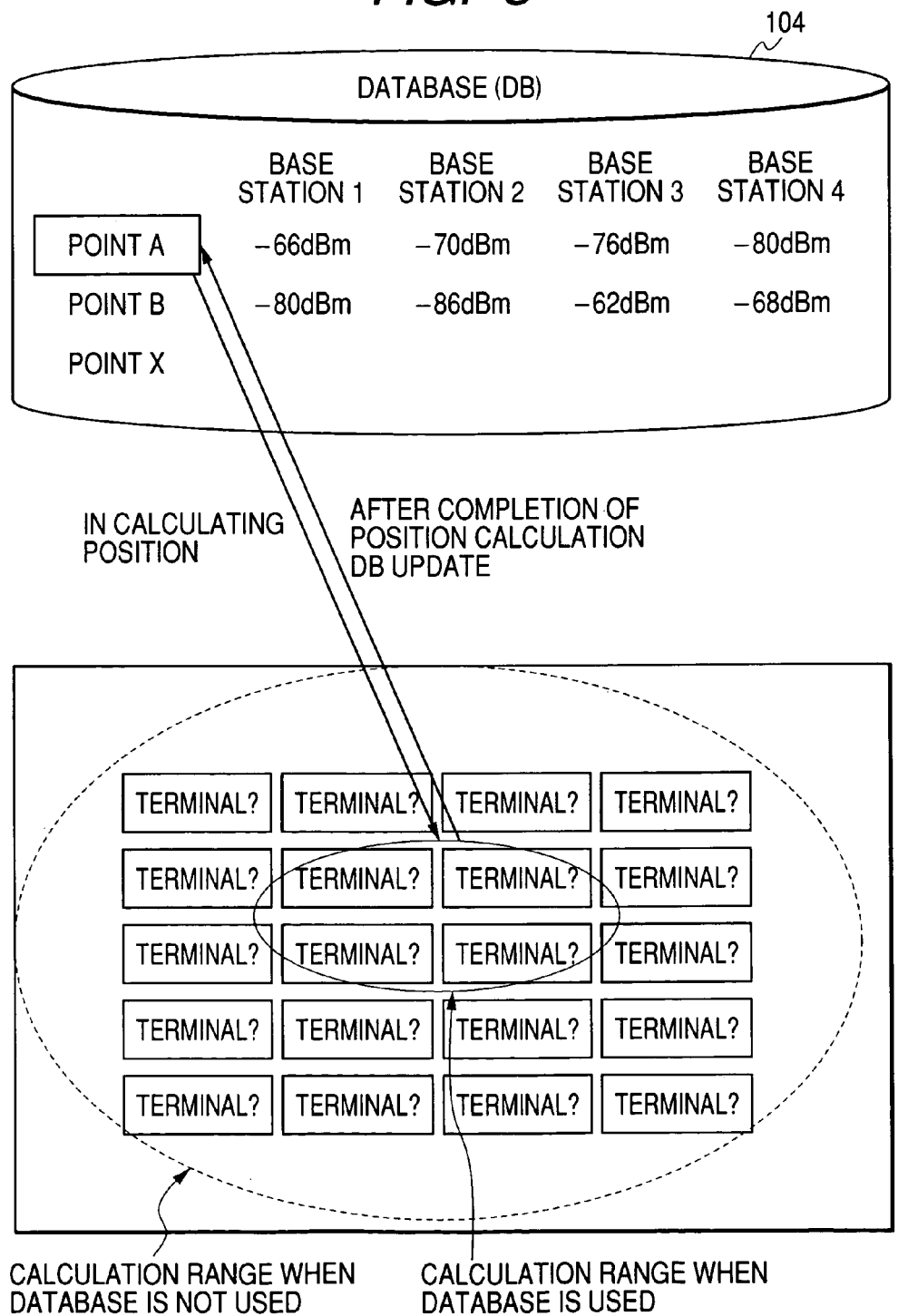
FIG. 8 is an explanatory view of speedup of a position calculation method and automatic database generation, in accordance with an embodiment of the present invention.

FIG. 8 is an explanatory view of speedup of the position detection method, and of automatic database generation in an embodiment of the present invention. In executing the position detection using signal time-difference-of-arrival, since the simultaneous equations (1) to (7) need to be solved, an amount of the calculations becomes great. In the least square error method, since there are many candidate coordinates of the terminal, the calculations take a long time. In the steepest gradient method, since a local minimum point is determined as the solution according to some initially set coordinates, the right solution cannot be obtained in some cases. According to the present invention, since candidate points highly correlated with the received power information measured by the terminal or base stations can be determined using the database 104, position detection errors of the simultaneous equations for a plurality of positions neighboring the highly correlated points are evaluated to determine a position having the smallest error. As a result, an amount of the calculations can be reduced. Additionally, by feeding the solution determined using signal time-difference-of-arrival back to the database 104, the database 104 is updated at any time, also increasing accuracy of the position detection using received power.

FIG. 8 shows an example of received power value recorded in the database 104. Information about signal time-differences-of-arrival between each base station and the terminal can be determined after calculation of the position detection using signal time-difference-of-arrival, and may be recorded in the database 104.

Figure 9:
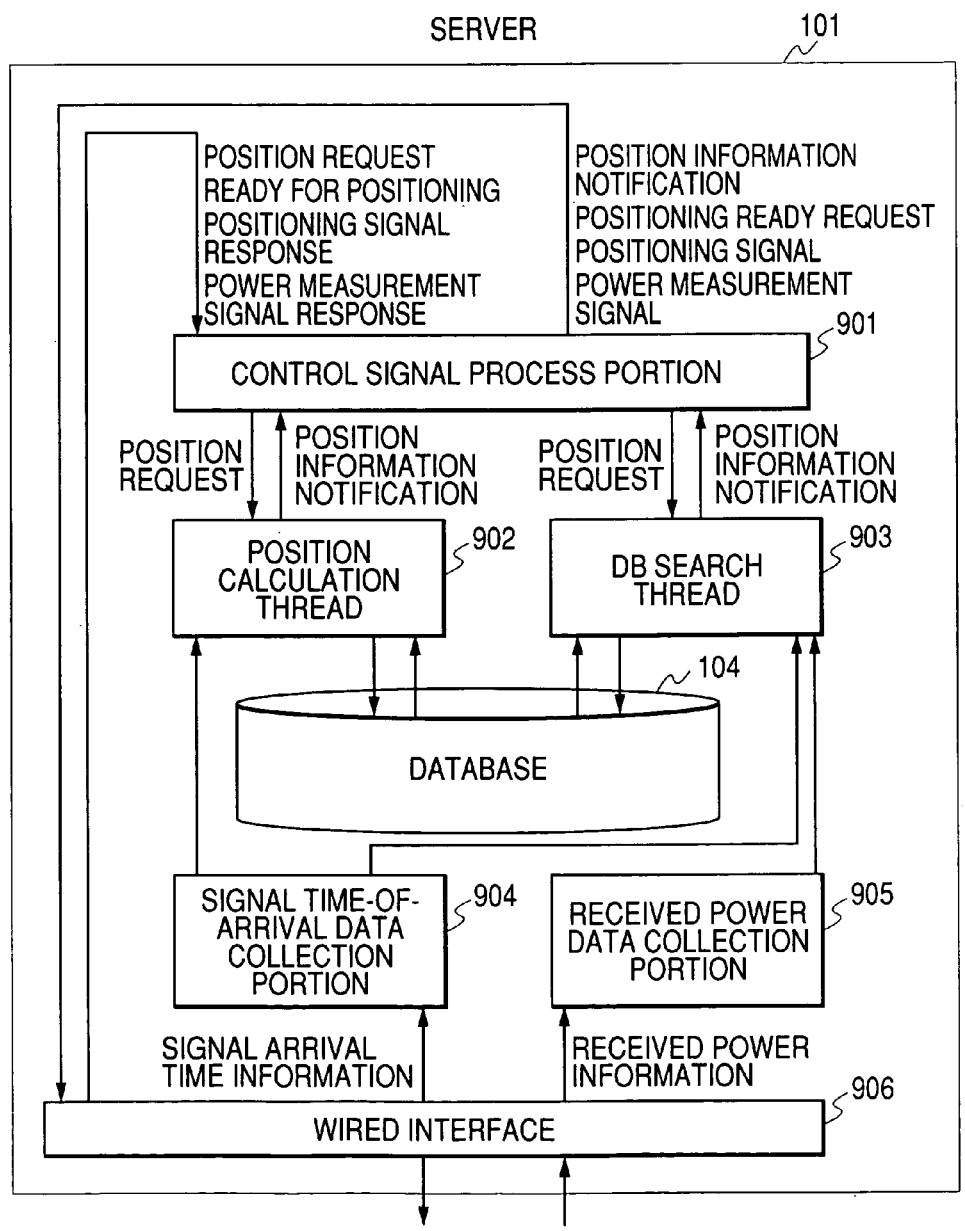
FIG. 9 shows a configuration of a server, in accordance with an embodiment of the present invention.

FIG. 9 shows a configuration of a server according to an embodiment of the present invention. A server 101 includes a wired interface 906 for processing communications with base stations, a control signal process portion 901 for processing a protocol which controls base stations and a terminal to execute position detection, a signal time-of-arrival data collection portion 904 for collecting signal time-of-arrival information from the base stations, a received power data collection portion 905 for collecting received power information from the terminals or the base stations, a database 104 for storing the collected data, a position calculation thread 902 for executing position calculation using time-difference-of-arrival according to trilateration by use of data stored in the database 104, and a database search thread 903 for determining a position by executing database search using received power information.

Since the position calculation thread 902 and database search thread 903 are processed in parallel, the control signal process portion 901 can notify the earlier determined information to the terminal.

Additionally, the control signal process portion 901 may transmit a position request to both the position calculation thread 902 and database search thread 903 to determine the position in parallel, or to only either of them to determine the position. For this switching judgment, a method for regularly executing the position calculation methods according to a previously set mode and a method for dynamically switching the position calculation methods can be used. The latter method is explained in the following.

First, both the position calculation thread 902 and database search thread 903 execute the position calculations. The database search thread 903 searches the database 104 by using, as search keys, received powers obtained from the received power data collection portion 905. Concretely, the sum of the squares of differences between received power values recorded in the database and measured received power values is checked to determine the least sum of the squares as the position. Alternatively, the database search thread 903 can search the database 104 by using, as search keys, signal time-differences-of-arrival obtained from the signal time-difference-of-arrival data collection portion 904. The sum of the squares of differences between the signal time-difference-of-arrival and measured signal time-difference-of-arrival is determined to determine the least sum of the squares as the position.

When the sum of the squares is over a threshold, a result of the position calculation of the database search thread 903 is not determined. In this case, the database search thread 903 stops, and the position calculation thread 902 executes the position calculations. When the position calculations by the position calculation thread 902 is over the predetermined number of attempts, the database 104 is judged to store enough data, and then the position search by the database search thread 903 restarts. When the sum of the squares is equal to or under the threshold, a result of the position detection determined by the database search thread 903 is judged to be reliable. In this case, the position calculation thread 902 stops. When the sum of the squares is over the threshold, the position calculation thread 902 restarts. Additionally, since the database 104 stores no data at the initial activation, the position calculations by the position calculation thread 902 are executed the predetermined number of attempts to store enough data in the database 104. After that, the position calculations by the database search thread 903 are executed.

FIG. 10 shows a configuration in an embodiment of the present invention. The base station 102a includes a wired interface 1012 for processing communications with the server 101, a control signal process portion 1011 for processing a protocol for position detections, an antenna 1001 for transmitting/receiving radio signals, a radio module 1002 for processing signals transmitted/received through the antenna 1001, a received power measurement portion 1009 for measuring received powers of signals processed in the radio module 1002, a position detection module 1007 having a memory 1008 for storing signals for position detections from the radio module 1002, and a time-of-arrival collection portion 1010 for selecting/extracting positioning signals and positioning signal responses from the position detection module 1007.

The radio module 1002 includes a base band transmission portion 1005 for modulating signals transmitted from the wired interface 1012 to a radio section by means of a defined radio communications method, a radio transmission portion 1003 for executing D/A conversion, filtering, and power amplification, the D/A conversion being for converting digital signals from the base band transmission portion 1005 to analog signals, a radio reception portion 1004 for executing filtering of received signals from the antenna 1001 and A/D conversion for converting analog signals to digital signals, and a base band reception portion 1006 for demodulating signals from the radio reception portion 1004 by means of the defined radio communications method.

After demodulation in the base band reception portion 1006, the time-of-arrival collection portion 1010 checks base station addresses, a terminal address, and data types described in received signals, the data types showing whether the received signals are positioning signals or positioning signal responses, and compares timestamps stored in a memory and timestamps stored in the base band reception portion 1006, so that it can derive required data from the memory.

The received power measurement portion 1009 generates received power information. The time-of-arrival collection portion 1010 generates time-of-arrival information. The server is notified of the generated information via the wired interface 1012.

The control signal process portion 1011 is set to a frequency channel contained in a control signal of the positioning preparation request, and notifies a control signal of the positioning preparation completion to the server.

FIG. 11 shows a configuration of a terminal in an embodiment of the present invention. A terminal 103 includes an antenna 1101 for transmitting/receiving signals of a radio section, a radio module 1002 for processing radio communications with the base station 102a, a control signal process portion 1107 for processing a protocol of position detection signals, and a received power measurement portion 1108 for measuring received powers of signals received in the radio module 1002.

The radio module 1102 has basically the same components as the radio module 1002 of the base station 102a.

The control signal process portion 1107 has a function for returning a positioning signal response in response to a positioning signal, and a power measurement signal response in response to a power measurement signal. For example, any terminal based on ICMP (Internet Control Message Protocol) and having ICMP Echo function as its standard one may use a ping command as the positioning signal and power measurement signal. In this case, the control signal process portion 1107 in particular does not need to be added to the terminal.

The received power measurement portion 1108 measures received powers of beacon signals transmitted from the neighboring base stations, and notifies the server of the measured received power information via the base station in communication with the terminal. When the base stations collect the received power information and notifies it to the server, the function of the received power measurement portion 1108 becomes unnecessary, thus simplifying the structure of the terminal.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining a position of a terminal in a system having a terminal apparatus, a plurality of base stations in communication with the terminal apparatus, and a server apparatus connected to the plurality of base stations via a network, the method comprising:

detecting via the server apparatus a position of the terminal apparatus through at least either a first position detection process or a second position detection process;

performing a first position detection process, including receiving at others of the plurality of base stations signals transferred between one of the plurality of base stations and the terminal apparatus, collecting at the server apparatus information about reception timings of the signals received at each of the others of the plurality base stations, and calculating a position of the terminal apparatus using a plurality of the reception timings and position information about the others of the plurality of base stations;

performing a second position detection process, including collecting at the server apparatus measurement information about received powers of signals transferred between the terminal apparatus and the others of the plurality of base stations, and searching a received power measurement information database previously stored in the server apparatus using a plurality of the measurement information about the received powers, and determining a position of the terminal apparatus based on the searching;

storing, in the received power measurement information database, the position information and received power measurement information corresponding to the position information, the position information being obtained by at least one of the first position detection process and the second position detection process, and the received power measurement information being the received powers of the signals corresponding to the plurality of base stations in response to that the terminal apparatus is detected to be at the position indicated by said position information; and determining via the server apparatus whether to execute the second position detection process according to information stored in the received power measurement information database.

2. The method of claim 1, further comprising:
executing via the server apparatus the first and second position detection processes in parallel;
outputting via the server apparatus position information of the terminal apparatus; and
determining the position information according to a result of the position detection process which has completed earlier than another.

3. The method of claim 1, further comprising:
determining a position of the terminal apparatus by way of the first position detection process;
collecting via the server apparatus measurement information about the received signal powers when the terminal apparatus is at the determined position; and
storing via the received power measurement information database the determined position and the received power measurement information about the received signal powers, the determined position corresponding to the measurement information.

4. The method of claim 1, further comprising at the server apparatus:
determining a position range by executing the second position detection process;
evaluating position detection errors of a plurality of positions within the position range; and
determining a position having a smallest error as the position of the terminal apparatus.

5. The method of claim 1, wherein the received power information is information about received powers of signals transmitted from a plurality of the base stations to the terminal apparatus, the received powers being measured in the terminal apparatus.

6. The position detection method according to claim 1, wherein the received power information is information about received powers of signals transmitted from the terminal apparatus to a plurality of the base stations, the received powers being measured in a plurality of the base stations.

7. The method of claim 1, further comprising at the server apparatus:
determining whether to execute the first or second position detection process; and
requesting information required for the determined position detection process from a plurality of the base stations.

8. A system for detecting a position of a terminal, the system comprising:
a terminal apparatus;
a plurality of base stations in radio communication with the terminal apparatus;
a server apparatus connected to a plurality of the base stations via a network,
wherein the server apparatus includes a position detection process portion and a storage apparatus having a received power measurement information database,
wherein the position detection process portion is configured to detect a position of the terminal apparatus through at least one of a first or second position detection process,
wherein the first position detection process includes receiving at others of the plurality of base stations signals transferred between one of the plurality of base stations and the terminal apparatus, collecting at the server apparatus information about reception timings of the signals received at each of the others of the plurality base stations, and calculating a position of the terminal apparatus using a plurality of the reception timings and position information about the others of the plurality of base stations,
wherein the second detection process includes collecting at the server apparatus measurement information about received powers of signals transferred between the terminal apparatus and the others of the plurality of base stations, and searching a received power measurement information database previously stored in the server apparatus using a plurality of the measurement information about the received powers, and determining a position of the terminal apparatus based on the searching,
wherein the position information and received power measurement information corresponding to the position information are stored in the received power measurement information database, the position information being obtained by at least one of the first position detection process and the second position detection process, and the received power measurement information being the received powers of the signals corresponding to the plurality of base stations in response to that the terminal apparatus is detected to be at the position indicated by said position information, and
wherein the position detection process portion includes determining whether to execute the second position detection process according to the information stored in the received power measurement information database.

9. The system of claim 8, wherein the position detection process portion of the server apparatus is configured to execute the first and second position detection processes in substantially parallel and to output position information about the terminal apparatus, the position information being determined according to a result of the position detection process which has completed earlier than another.

10. The system of claim 8, wherein the first position detection process is configured to determine a position of the terminal apparatus, wherein the server apparatus is configured to collect measurement information about the received signal powers when the terminal apparatus is at the determined position, and wherein the received power measurement information database is configured to store the determined position the measurement information about the received signal powers, the determined position corresponding to the measurement information.

11. The system of claim 8, wherein the position detection process portion is configured to execute the second position detection process to determine a position range, to evaluate a position detection error of a plurality of positions within the position range, and to determine a position having the smallest error as a position of the terminal apparatus.

12. The system of claim 8, wherein the measurement information about received powers is information about received powers of received signals transmitted from the terminal apparatus to a plurality of the base stations, the received powers being measured in a plurality of the base stations.

13. The system of claim 8, wherein the received power information is information about received powers of received signals transmitted from the terminal apparatus to a plurality of the base stations, the received powers being measured in a plurality of the base stations.

14. A server apparatus of a terminal position detection system including a terminal apparatus, a plurality of base stations in radio conmiunication with the terminal, and a server apparatus connected to a plurality of the base stations, the server apparatus comprising:
a position detection process portion configured to detect a position of the terminal apparatus through at least a first or second position detection process; and
a storage apparatus including a measurement information database,
wherein the server apparatus includes a position detection process portion and a storage apparatus having a received power measurement information database,
wherein the position detection process portion is configured to detect a position of the terminal apparatus through at least one of a first or second position detection process,
wherein the first position detection process includes receiving at others of the plurality of base stations signals transferred between one of the plurality of base stations and the terminal apparatus, collecting at the server apparatus information about reception timings of the signals received at each of the others of the plurality base stations, and calculating a position of the terminal apparatus using a plurality of the reception timings and position information about the others of the plurality of base stations,
wherein the second detection process includes collecting at the server apparatus measurement information about received powers of signals transferred between the terminal apparatus and the others of the plurality of base stations, and searching a received power measurement information database previously stored in the server apparatus using a plurality of the measurement information about the received powers, and determining a position of the terminal apparatus based on the searching, wherein the position information and received power measurement information corresponding to the position information are stored in the received power measurement information database, the position information being obtained by at least one of the first position detection process and the second position detection process, and the received power measurement information being the received powers of the signals corresponding to the plurality of base stations in response to that the terminal apparatus is detected to be at the position indicated by said position information, and wherein the position detection process portion includes determining whether to execute the second position detection process according to the information stored in the received power measurement information database.

15. The server apparatus of claim 14, wherein the position detection process portion is configured to execute the first and second position detection processes in parallel, and to output position information about the terminal apparatus, the position information being determined according to a result of the position detection process which has completed earlier than another.

16. The server apparatus of claim 14, wherein the first position detection process is configured to determine a position of the terminal apparatus, wherein the server apparatus is configured to collect measurement information about the received signal powers when the terminal apparatus is at the determined position, and wherein the received power measurement information database is configured to store the determined position the measurement information about the received signal powers, the determined position corresponding to the measurement information.

17. The server apparatus according to claim 14, wherein the position detection process portion is configured to execute the second position detection process to determine a position range, to evaluate a position detection error of a plurality of positions within the position range, and to determine a position having the smallest error as a position of the terminal apparatus.

18. The server apparatus according to claim 14, wherein the received power information is information about received powers of received signals transmitted from a plurality of the base stations to the terminal apparatus, the received powers being measured in the terminal apparatus.

19. The server apparatus according to claim 14, wherein the measurement information about received powers is information about received powers of received signals transmitted from the terminal apparatus to a plurality of the base stations, the received powers being measured in a plurality of the base stations.

* * * * *